May 6, 1930. C. H. BOYLE 1,757,073
CULINARY KNIFE
Filed Feb. 26, 1929

INVENTOR
Charles H. Boyle
BY
ATTORNEY

Patented May 6, 1930

1,757,073

UNITED STATES PATENT OFFICE

CHARLES H. BOYLE, OF NEW HAVEN, CONNECTICUT

CULINARY KNIFE

Application filed February 26, 1929. Serial No. 342,795.

This invention relates to a new and improved culinary knife of the type used for cutting fruit, vegetables and the like, in such manner as to present a neat, pleasing and ornamental appearance.

Among the aims and objects of the invention may be recited the provision of a device of this character which may be so designed as to be economically constructed, most efficient in its operation and readily cleaned.

To these, and other ends, my invention consists in the culinary knife having certain details of construction, and combinations of parts, as will be hereinafter described and more particularly pointed out in the claims.

Referring to the drawings, in which like numerals of reference indicate like parts in the several figures.

My improved culinary knife is preferably constructed with a wire frame formed so as to have two substantially parallel side portions 10 which are twisted together at 12 to form a shank to receive a handle 13, and an intermediate end portion 11.

Figure 3:
Figure 3 is a transverse sectional view thereof, taken generally upon line 3—3 of Figure 2.

Secured to the side portions 10 in any convenient manner is the blade 14, which is corrugated in cross section, substantially as shown in Figure 3, with a front edge at an angle to the length thereof, thereby producing a cutter having a plurality of pointed beveled cutting faces 16.

Figure 1:
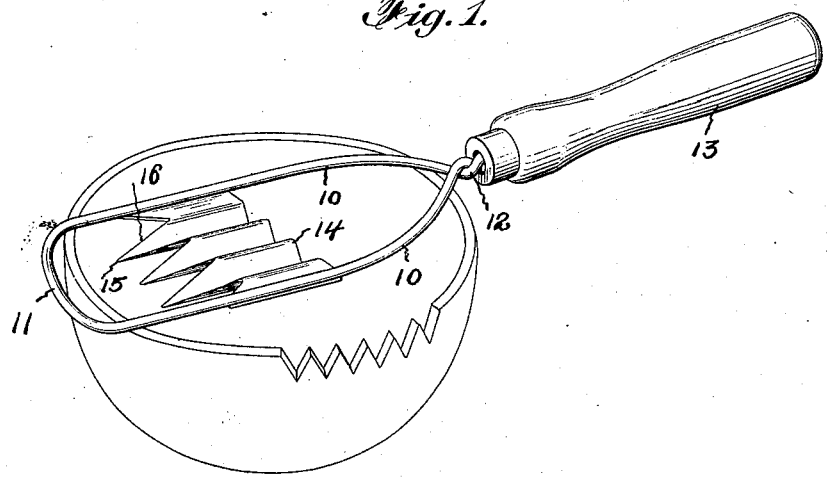
Figure 1 is a perspective view of a portion of a fruit, the peel of which has been partially cut by my improved knife, and wherein the same is positioned thereon for use in further cutting operations.
Figure 2:
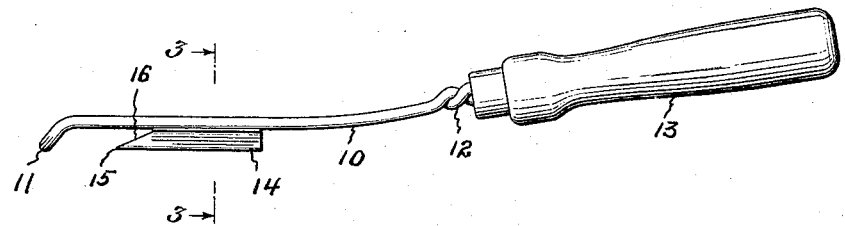
Figure 2 is a view of my improved culinary knife.

In Figure 1 there is illustrated a portion of an orange, grapefruit or the like, with my improved culinary knife associated therewith in position to begin cutting the peel thereof. As thus placed, the side portions 10 rest upon the top of the fruit with the cutting knife inside of the peel. From this position the knife is pushed outwardly and the several points 15 of the cutting faces 16 enter the peel below the exposed top thereof. The opening made thereby is gradually enlarged toward the top of the fruit as the knife continues its movement. When the cutting is completed the knives project above the top of the fruit leaving the edge of the peel uncut, substantially as shown in Figure 1, each movement of the knife producing a plurality of scallops.

The shape of the knife may, of course, be varied, and thus produce edge cuttings of various shapes.

The end portion 11, which projects downwardly over the edge of the peel, provides a stop to limit and prevent the knife from being drawn too far inwardly and economize the labor involved in adjusting the knife relatively to the peel to be cut. It also forms a guard to protect the sharp points of the knife as well as the hand of the operator.

With the knife supported on the side portions, the operator pushes it back and forth without lifting it from the fruit. In one direction the knife cuts the peel, and in the opposite direction its movement is limited by the end portion engaging the outside of the peel.

As the knife points 15 enter the peel below the top thereof and cut upwardly, the possibility of the peel not being cut uniformly or the edges of the peel broken down is eliminated. All of the cuts in the peel are also of uniform height and shape due to the fact that the side portion 10 rests upon the top of the peel and move back and forth as in a sawing operation.

Within the scope of the appended claims, modifications may be made within my invention, aside from those herein suggested, and I would therefore have it understood that I do not limit myself to the exact construction herein shown and described, but claim all that falls fairly within the spirit and scope of the appended claims.

Having described my invention, what I claim as new and desire to secure by Letters Patent, is:

1. A device of the character described, having side portions connected by an end portion in a different plane than the side portion;

and a blade connected with the side portions at a point distant from the end portion.

2. A device of the character described for trimming fruit peel or the like, having side portions, an end portion in a different plane than the side portion, a handle connected with the side portions, and a blade fixed to the side portions between the handle and end portions.

3. A device of the character described for trimming fruit peel or the like, having a pointed blade; means for supporting the blade; and a guard spaced from and extending across the front of the pointed blade.

4. A device of the character described, having a blade corrugated transversely with pointed and sharpened ends at one side thereof; and means for protecting the points of the blade consisting of a member to which the blade is secured and formed so as to be in part substantially parallel with the length of the blade and in part at substantially a right angle to such length.

In testimony whereof, I have hereunto affixed my signature.

CHARLES H. BOYLE.